(12) United States Patent
Kalaba

(10) Patent No.: US 10,381,816 B2
(45) Date of Patent: Aug. 13, 2019

(54) RIBBON TRAINABLE AROUND A TAKE-UP DEVICE AND A SYSTEM DEPLOYING SUCH A RIBBON

(71) Applicant: TAIT TOWERS MANUFACTURING, LLC, Lititz, PA (US)

(72) Inventor: Boris Kalaba, Lititz, PA (US)

(73) Assignee: TAIT TOWERS MANUFACTURING, LLC, Lititz, PA (US)

( * ) Notice: Subject to any disclaimer, the term of this patent is extended or adjusted under 35 U.S.C. 154(b) by 336 days.

(21) Appl. No.: 15/293,950

(22) Filed: Oct. 14, 2016

(65) Prior Publication Data

US 2017/0110866 A1    Apr. 20, 2017

Related U.S. Application Data

(60) Provisional application No. 62/241,826, filed on Oct. 15, 2015.

(51) Int. Cl.

| | | |
|---|---|---|
| *H02G 11/02* | (2006.01) | |
| *H02G 11/00* | (2006.01) | |
| *A63J 1/02* | (2006.01) | |
| *B66D 1/12* | (2006.01) | |
| *B66D 1/30* | (2006.01) | |
| *B66D 1/60* | (2006.01) | |

(52) U.S. Cl.
CPC .............. *H02G 11/02* (2013.01); *A63J 1/028* (2013.01); *B66D 1/12* (2013.01); *B66D 1/30* (2013.01); *B66D 1/60* (2013.01); *H02G 11/003* (2013.01)

(58) Field of Classification Search
CPC . H02G 11/02; B66D 1/12; B66D 1/30; B66D 1/60

See application file for complete search history.

(56) References Cited

U.S. PATENT DOCUMENTS

| 5,468,159 | A | * | 11/1995 | Brodsky | .............. | H01B 7/0846 |
| | | | | | | 174/117 F |
| 6,328,243 | B1 | * | 12/2001 | Yamamoto | ......... | B65H 75/4449 |
| | | | | | | 191/12.2 R |

(Continued)

FOREIGN PATENT DOCUMENTS

WO        2014173528 A1    10/2014

*Primary Examiner* — Jason C Smith

(74) *Attorney, Agent, or Firm* — McNees Wallace & Nurick LLC

(57) ABSTRACT

A system that comprises a winch apparatus for manipulating loads associated with public performances, such as performances involving performers and staging equipment, and in which one or more ribbons are deployed each of which is windable around, and unwindable from, a drum, a spool, or other take-up device. Also included is a ribbon for an arrangement via which electrical power can be supplied to a load via a suspension member, such as a band or cable, while movement of the load occurs via deliberate winding up of the band or cable onto the drum or sheave or unwinding of the band or cable from the drum or sheave. The ribbon includes an electrical lead portion having one or a plurality of individual electrical leads and a sheath portion. The sheath portion and the electrical lead portion are moveable with respect to each other.

10 Claims, 12 Drawing Sheets

(56) References Cited

U.S. PATENT DOCUMENTS

| | | | | |
|---|---|---|---|---|
| 6,460,795 B1* | 10/2002 | Brown, Jr. | ............. | B65H 75/38 |
| | | | | 191/12.2 R |
| 7,201,365 B2* | 4/2007 | Crawford | ................ | B66C 13/14 |
| | | | | 114/254 |
| 9,026,269 B2* | 5/2015 | Cross | ...................... | B60L 15/40 |
| | | | | 701/2 |
| 2013/0187011 A1* | 7/2013 | Rifenburg | ............ | A61G 12/008 |
| | | | | 248/68.1 |
| 2017/0110866 A1* | 4/2017 | Kalaba | ................... | H02G 11/02 |

* cited by examiner

RIBBON TRAINABLE AROUND A TAKE-UP DEVICE AND A SYSTEM DEPLOYING SUCH A RIBBON

FIELD OF THE INVENTION

The present disclosure relates to a ribbon that is windable around, and unwindable from, a drum, a sheave, a spool, or other take-up device.

BACKGROUND OF THE INVENTION

Patent document WO 2014/173528 to Solari discloses a movement device A that is linked to at least one lighting source 1 by means of metallic bands 4 for support and movement which allow an up and down movement for the lighting source. The device A houses all the components for the movement and the power supply to the lighting source 1. The device A is fitted on the ceiling with an anchoring bracket 1 on a housing 2, fitted with a cover plate 3. A metallic band 4 is preferably of stainless steel and electrically and mechanically connects the device A to the lighting source 1.

While the arrangement shown in Patent document WO 2014/173528 to Solari may be satisfactory for a load requiring the provisioning of electrical current, it would also be desirable to provide an arrangement via which electrical power can be supplied to a load via a suspension member, such as a band or cable, while movement of the load occurs in the course of relatively frequent cycles of winding up of the band or cable onto the drum or sheave and unwinding of the band or cable from the drum or sheave. For example, it would be desirable to provide an arrangement via which electrical power can be supplied to a load via a suspension member, such as a band or cable, while movement of the load occurs during cycles of less than one minute (60 seconds) duration, with each complete cycle involving a winding up of the band or cable onto the drum or sheave and an unwinding of the band or cable from the drum or sheave.

Consequently, there is a need for an arrangement via which electrical power can be supplied to a load via a suspension member, such as a band or cable, while movement of the load occurs via deliberate winding up of the band or cable onto the drum or sheave or unwinding of the band or cable from the drum or sheave.

BRIEF DESCRIPTION OF THE INVENTION

One aspect of the disclosure relates to a ribbon that is windable around, and unwindable from, a drum, a sheave, a spool, or other take-up device.

Another aspect of the disclosure relates to a ribbon for an arrangement via which electrical power can be supplied to a load via a suspension member, such as a band or cable, while movement of the load occurs via deliberate winding up of the band or cable onto the drum or sheave or unwinding of the band or cable from the drum or sheave. The ribbon includes an electrical lead portion having one or a plurality of individual electrical leads and a sheath portion. The sheath portion and the electrical lead portion are moveable with respect to each other.

Another aspect of the disclosure relates to a system that comprises a winch apparatus for manipulating loads associated with public performances, such as performances involving performers and staging equipment, and in which one or more ribbons are deployed each of which is windable around, and unwindable from, a drum, a spool, or other take-up device. In this connection, the ribbon of the present invention can be incorporated into a display system that comprises a winch assembly manipulating loads, such as, for example, illuminated or illuminating items, sound or sensory media items, or visual displays.

An advantage of the ribbon of the present disclosure is that the ribbon can interconnect a load requiring a supply of electrical current to an electrical source and the ribbon, in effecting this interconnecting arrangement, can operate as the sole or only operative connection between a device, such as a drum or sheave, and the load. In this respect, the ribbon performs both a load bearing function and an electrical supply function without the need, for example, of a separate windable and unwindable member providing a load bearing function and a second windable and unwindable member providing an electrical supply function. The ribbon can fulfill its dual load bearing and electrical supply functions both in circumstances in which the load secured to the free end of the ribbon is not subjected to movement or repositioning (i.e., a static load) and in which the load is subjected to movement or repositioning. Movement of a load can occur, for example, via a deliberate or inadvertent application of a force against the load or the ribbon. Additionally, movement of a load can occur via deliberate winding up of the ribbon onto the drum or sheave or unwinding of the ribbon from the drum or sheave.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
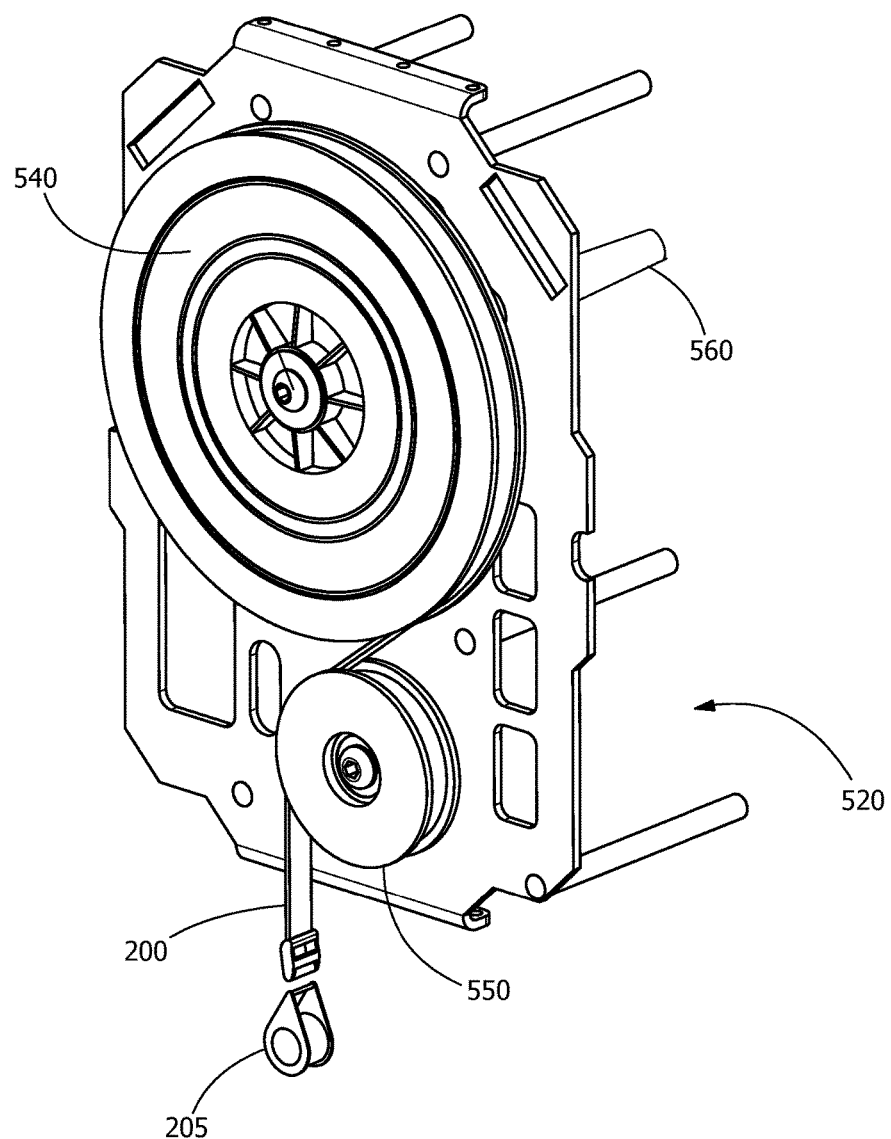
FIG. 1 is a front perspective view of an exemplary winch arrangement for deploying the ribbon of the present invention.
Figure 2:
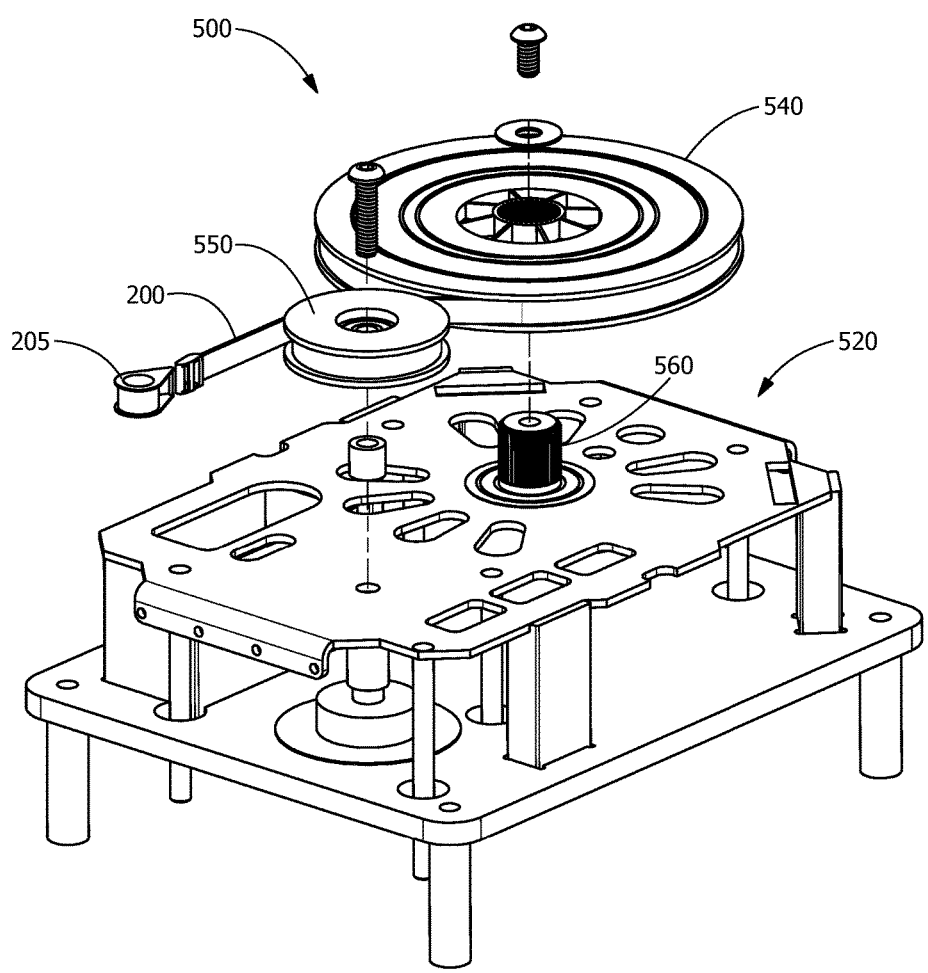
FIG. 2 is an exploded front perspective view of a portion of the exemplary winch arrangement shown in FIG. 1.

As shown in FIG. 1, an embodiment of the presently disclosed invention includes a winch arrangement 500 for deploying a ribbon 200. FIG. 2 shows an exploded front perspective view of a portion of the exemplary winch arrangement 500 shown in FIG. 1. Ribbon 200, described in greater detail below, includes one end mounted to a spool-up sheave 540 that is comprised in a winch assembly 520. The spool-up sheave 540 is mounted to a drive spindle 560 which is operatively connected to a controllable drive motor (not shown) for rotative driving of the spool-up sheave 540. While spool-up sheave 540 is shown as a sheave structure, any collection element having a suitable peripheral surface and delimiting a collection element axis about which the peripheral surface can be moved during a take up operation in which the ribbon 200 is taken up onto the peripheral surface may be used. Ribbon 200 is trained around a reception sheave 550 at a location relatively proximate to the location at which ribbon 200 runs beyond the outer annular periphery of the spool-up sheave 540. The reception sheave 550 is rotatably mounted on a non-driven spindle and the axis of rotation of the reception sheave 550 is parallel to the axis of rotation of the spool-up sheave 540. The reception sheave 550 includes a center core around a portion of which the ribbon 200 is trained and the reception sheave 550 includes a pair of spaced apart annular plates co-axially mounted to the center core at an axial spacing from one another. The spaced apart annular plates each have a larger diameter than the center core, whereupon the ribbon 200 as it is trained around a portion of the center core is axially intermediate the spaced apart annular plates. In one embodiment, the reception sheave 550 functions as a guide roller, where the ribbon 200 is guided onto spool-up sheave 540. In one embodiment, the reception sheave 550 is a deep groove change of direction sheave structure with top of slot retainer configured to prevent the ribbon 200 from exiting the roller while the sheave structure has a radial depth greater than the width of the tape so as to permit the tape to freely twist. Ribbon 200 also supports a load 205. Load 205 may be any suitable device that is desirable lowered or lifted. Load 205 is preferably a powered device that receives power and/or signal. For example, in one embodiment, load 205 may be a light emitting diode (LED) arrangement that is controllable illuminated, for example, as part of visual display or entertainment element. In one embodiment of the present disclosure, the winch assembly 520 is devoid of pinch rollers or other structures that pinch or provide compressive forces to the ribbon 200 prior to the training around the spool-up sheave.

Figure 3:
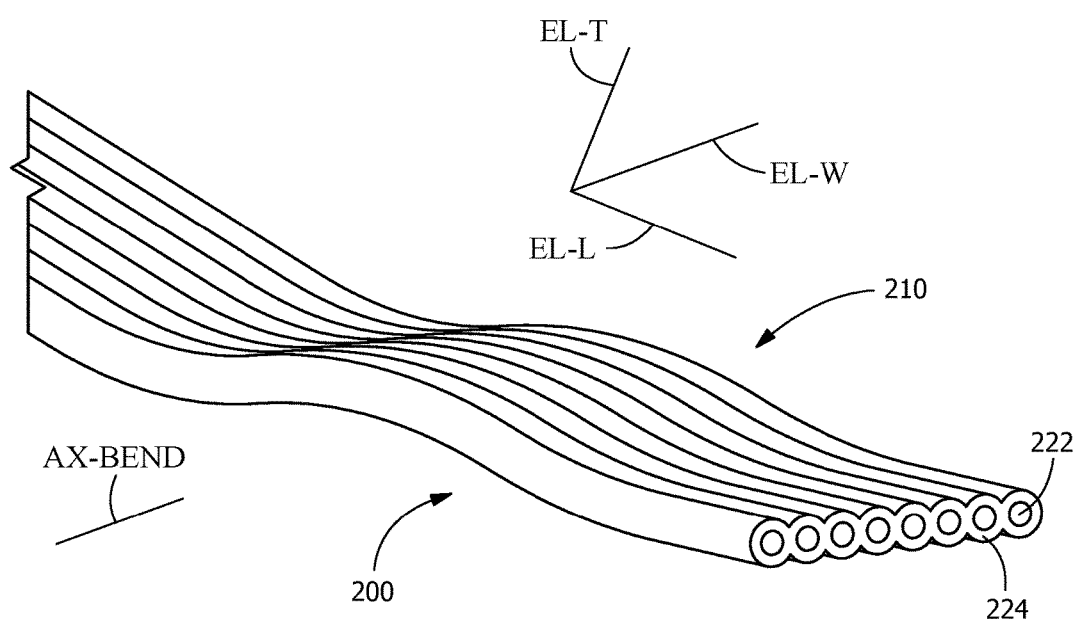
FIG. 3 is an enlarged front perspective view of a self-rigid ribbon, according to an embodiment of the present disclosure.
Figure 5:
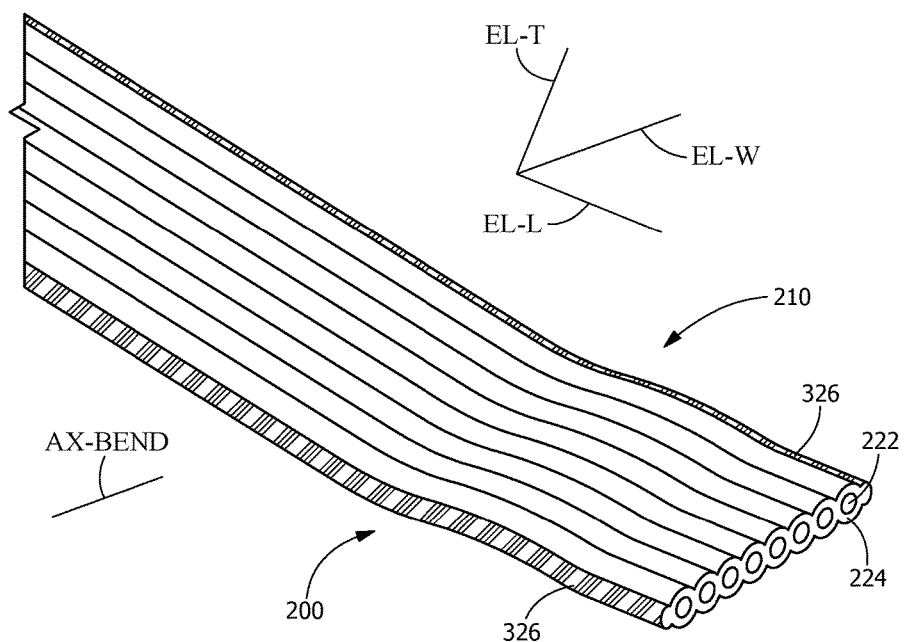
FIG. 5 is an enlarged front perspective view of an augmented ribbon, according to an embodiment of the present disclosure.

Ribbon 200, according to embodiments of the present disclosure, includes, in one aspect thereof, a ribbon that is windable around, and unwindable from, a drum, a sheave, a spool, or other take-up device. As described above, while not so limited, one suitable structure onto which the ribbon 200 may be windable upon is the spool-up sheave 540 shown in FIG. 1. As used herein, the term "ribbon" is intended to refer to an elongate component that is windable around, and unwindable from, a drum, a spool, or other take-up device. As shown in FIGS. 3 and 5, the elongate structure of ribbon 200 is characterized by having a length dimension EL-L, whereupon a winding up of ribbon 200 on a take-up device progressively reduces the effective length of ribbon 200 as measured along its length dimension EL-L and an unwinding of ribbon 200 from a take-up device progressively increases the effective length of ribbon 200 as measured along its length dimension EL-L. Ribbon 200 also has a width dimension EL-W, as measured in a direction perpendicular to its length dimension EL-L, and a thickness dimension EL-T as measured in a direction perpendicular to its length dimension EL-L and perpendicular to its width dimension EL-W. A "ribbon" suitable for deployment in connection with the method and apparatus of the present invention includes ribbon 200 whose thickness dimension EL-T is no greater than one-half (50%) of its width dimension EL-W. In some applications, it is preferable that the elongate component has a thickness dimension EL-T no greater than one-fourth (25%) of its width dimension EL-W and, in still other applications, it is preferable that the thickness dimension EL-T is no greater than one-tenth (10%) of the width dimension EL-W. Although such a ribbon 200 may be characterized as "flat", configurations of the ribbon of the present invention are not limited to configurations that could be characterized as flat, planar, or substantially planar.

Figure 4:
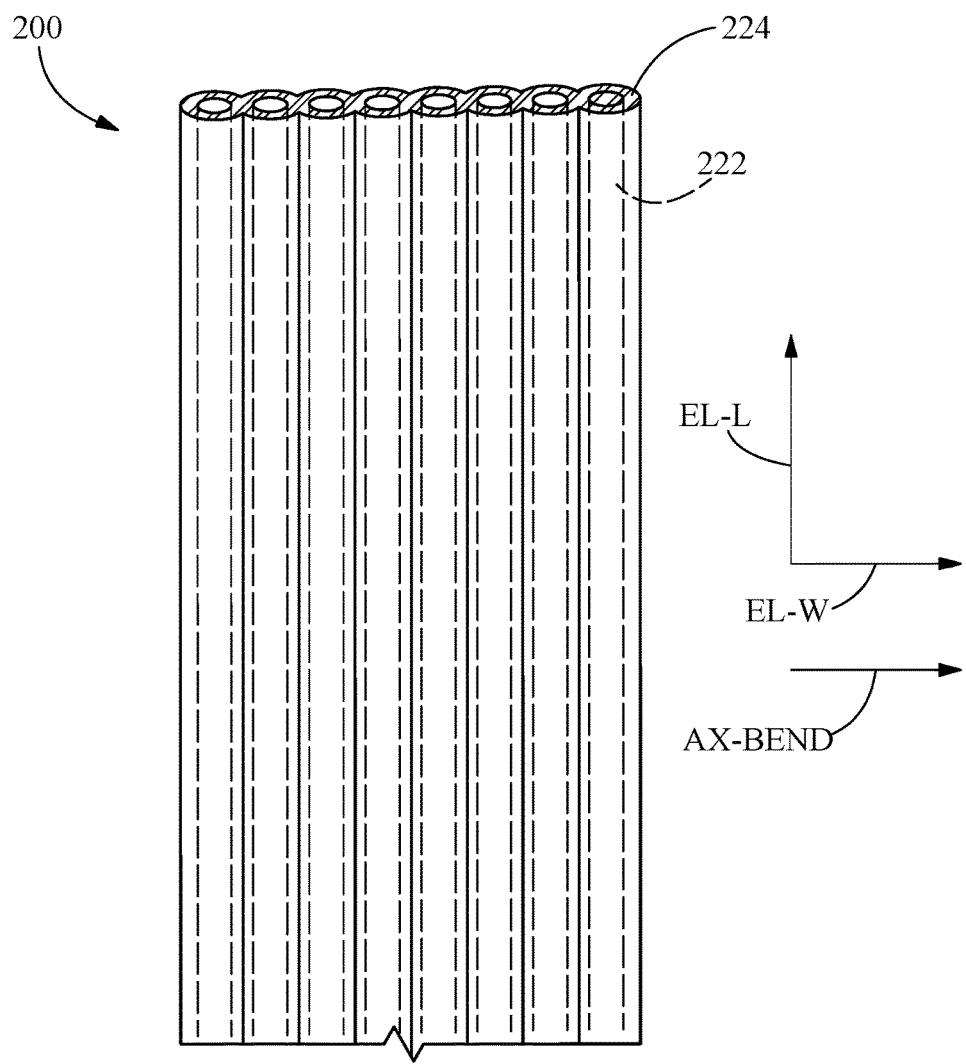
FIG. 4 is an enlarged schematic view of the ribbon of FIG. 3.

In one embodiment, as seen in FIG. 3, which is an enlarged front perspective view of a first designated configuration of ribbon 200, and in FIG. 4, which shows a schematic view of ribbon 200, ribbon 200 may be configured in a first designated configuration, hereinafter designated as the self-rigid ribbon 210, wherein ribbon 200 comprises an electrical lead portion 222 having a plurality of individual electrical leads and a sheath portion 224. The sheath portion 224 includes a body region and a lateral retention fiber arrangement. The lateral retention fiber arrangement of sheath portion 224 may include, for example, non-oriented fibers, woven fibers, knitted fibers, braided fibers, or other arrangements of fibers that provide lateral position of the electrical lead portion along the width direction EL-W. Although the sheath portion 224 retains the electrical leads in direction EL-W, the sheath portion 224 and the electrical lead portion 222 are moveable with respect to each other in the length dimension EL-L. Such movement between the sheath portion 224 is such that there may be variable loads across the electrical lead portions 222, but upon the winding of ribbon 200 onto spool-up sheave 540 (see, for example, FIGS. 1 and 2) or on similar structures such loads and movement are frozen or otherwise locked into the structure of ribbon 200 until ribbon 200 is deployed, unwound or otherwise removed from the spool-up sheave 540. Such freezing or locking of the loads and/or relative positions of the sheath portion 224 and electrical lead portion 222 is hereafter referred to as "load memory". Load memory may include a range of freezing or locking of the loads depending on the configuration, positioning and operational cycling (e.g., winding/unwinding cycles) of ribbon 200. For example, twist in the ribbon 200 may be loaded onto the spool-up sheave 540 and may, for example, temporarily increase the thickness and/or width of ribbon 200, which is wound up onto the spool-up sheave 540 in this modified thickness and/or width. In this configuration, the ribbon 200, upon unwinding, exits the spool-up sheave 540 and somewhere along the pay-out travel, the twist comes out of the ribbon 200 as a result of the load memory. In addition, it is possible that the extent of ribbon 200 may untwist to some degree due to the radially inward pressure of the later arriving cable on the spool-up sheave 540 that build up onto the already wound extent of the ribbon 200 and/or some "relaxation" may propagate along the ribbon 200. Such effects are subject to the load memory, wherein the fiber loads, ribbon deformation and/or potential movement of ribbon 200 in the wound position on the spool-up sheave 540 result in at least a portion of the loads on the sheath portion 224 and electrical lead portion 222 being frozen and/or locked sufficient to result in untwisting or resistance to twisting of ribbon 200 upon the unwinding.

"Locking" or "freezing", may include a load locking/load memory effect that results in a range of locking effects upon the winding and unwinding of ribbon 200. For example, the range of locking may extend from substantial locking, herein denominated as total locking, such as an extent of a ribbon 200 that experiences no, zero, or substantially zero untwisting when such extent of the ribbon 200 is wound up on the spool-up sheave 540 (with a reversal or a cessation of the locking when the extent of the ribbon 200 moves as the spool-up sheave 540 is rotated in an unwinding direction and the extent of the ribbon 200 is subsequently wound out) to minimal locking, such as an extent of a ribbon 200 that experiences, in association with the winding up of the extent of the ribbon 200 onto the spool-up sheave 540, a diminishment in the degree of twist that had been imparted to the extent of the ribbon 200, whereupon substantially all of the twist, up to all of the twist, in the extent of the ribbon 200 has ceased after the extent of the ribbon 200 has been wound up on the spool-up sheave 540 and before the spool-up sheave 540 is rotated in an unwinding direction.

It is to be understood that, in connection with the twist that may be imparted to an extent of the ribbon 200, the references herein to imparting of a twist, a cessation of the twist, a diminishment of the twist, or an increase in the twist, are intended to refer twist that was not present in the ribbon 200 in its non-deployed or nominal condition before the ribbon 200 had been installed onto the spool-up sheave 540. The principles of the present invention apply equally to the ribbon 200 configured in its non-deployed or nominal condition as a ribbon 200 with no original or inherent twist and configured in its non-deployed or nominal condition as a ribbon 200 with no original or inherent twist and configured in its non-deployed or nominal condition as a ribbon 200 with original or inherent twist. Also, the present invention contemplates that, in the event that certain discrete portions of the ribbon 200 have original or inherent twist, such as, for example, the sheath portion 224 of the ribbon 200, there may be operational situations in which the original or inherent twist of such portion of the ribbon 200 is influenced by the winding and unwinding operations, whereupon such original or inherent twist of such portion of the ribbon 200 may diminish from its original state or be restored to its original state from a diminished state, either in correspondence with similar diminishment or increase in a twist to the ribbon 200 imparted during the winding and unwinding operations or, alternatively, independently of any diminishment or increase in a twist to the ribbon 200 imparted during the winding and unwinding operations. Additionally, the present invention contemplates that, in the event that certain discrete portions of the ribbon 200 have original or inherent twist, such as, for example, the sheath portion 224 of the ribbon 200, there may be operational situations in which the original or inherent twist of such portion of the ribbon 200 is not influenced by the winding and unwinding operations in a manner in which the degree or nature of the twist in this portion of the ribbon 200 is changed while, contrastingly, another portion of the ribbon 200 is influenced by the winding and unwinding operations and has twist imparted to it. In any event, influences on, and changes in, both original or inherent twist of the ribbon 200 and newly introduced twist that was not present in the ribbon 200 in its non-deployed or nominal condition are to be understood as within the purview of the present invention.

A particular feature of this first designated configuration of self-rigid ribbon 210 is that the component of ribbon 200 that provides the greatest resistance to flexing or bending of the ribbon 200 about an axis parallel to its width dimension EL-W is the electrical lead portion 222. In other words, the electrical lead portion 222 imparts the property to the ribbon 200 of its greatest resistance to flexing or bending of the ribbon 200 about an axis parallel to its width dimension EL-W and neither the sheath portion nor any other portion of the ribbon 200 provide a resistance to flexing or bending of the ribbon 200 about an axis parallel to its width dimension EL-W greater than that provided by the electrical lead portion. As best seen in FIG. 3, the electrical lead portion imparts the property to the ribbon 200 of resistance to flexing or bending of the ribbon 200 about an axis AX-BEND parallel to its width dimension EL-W.

As seen in FIG. 3, the plurality of individual electrical leads of the electrical lead portion 222 of ribbon 200 are distributed at generally uniform spacings from one another along the width dimension EL-W and the fibers of the sheath portion 224 extend circumferentially around the entirety of each electrical lead.

Figure 6:
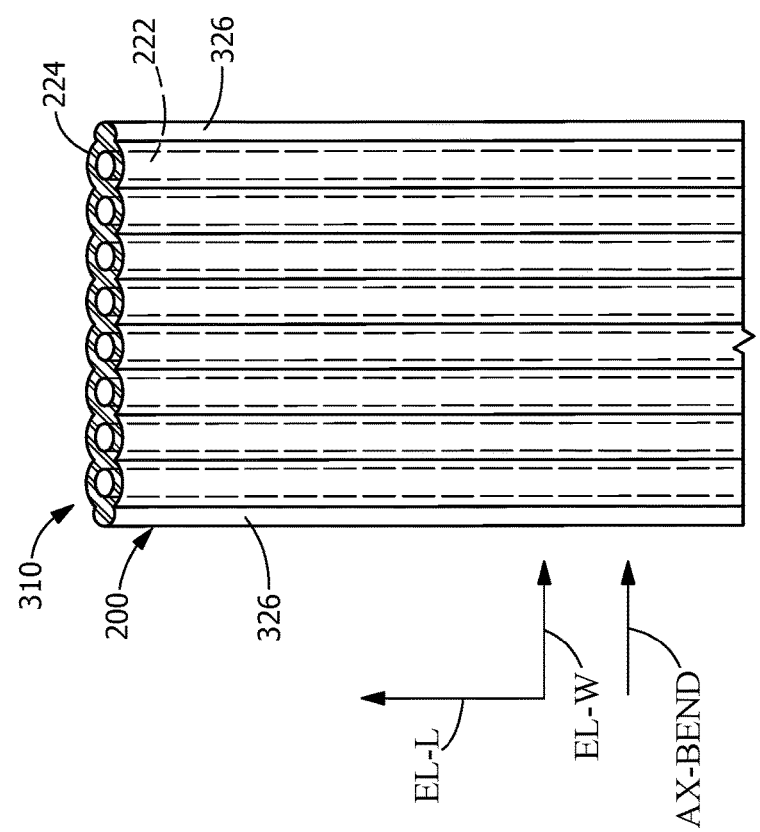
FIG. 6 is an enlarged schematic view of the ribbon of FIG. 5.

As seen in FIG. 5, which is an enlarged front perspective view of an additional embodiment of ribbon 200, and in FIG. 6, which shows a schematic view of ribbon 200, ribbon 200 may be configured in a second designated configuration, hereinafter designated as the augmented ribbon 310, wherein ribbon 200 comprises an electrical lead portion 222 having a plurality of individual electrical leads, a sheath portion 224, and an augmentation portion 326. The augmentation portion 326 may be configured with a single unitary cable or a plurality of cables, with the single unitary cable or the cables being distributed as desired on an outer surface or in the augmented ribbon 310. The augmentation portion 326 may be the same material as the fibers or sheath portion 224 or may be a different material, depending upon the load, stiffness and/or twisting resistance desired. The augmentation portion 326 imparts a resistance to flexing or bending of ribbon 200 about the axis AX-BEND parallel to its width dimension EL-W and may impart to ribbon 200 a greater resistance to flexing or bending of ribbon 200 about the axis AX-BEND than any of the other portions of ribbon 200 or may operate in combination with the other portions of ribbon 200 to impart ribbon 200 with a desired resistance to flexing or bending of ribbon 200 about the axis AX-BEND. In addition to the resistance to flexing or bending, the augmentation portion 326 of augmented ribbon 310 may provide additional load bearing. In one embodiment, the augmented ribbon 310 is moveable with respect to sheath portion 224 and, like the sheath portion 224 and the electrical lead portion 222, the augmentation portion 326 may have load memory when wound on the spool-up sheave 540.

Figure 7:
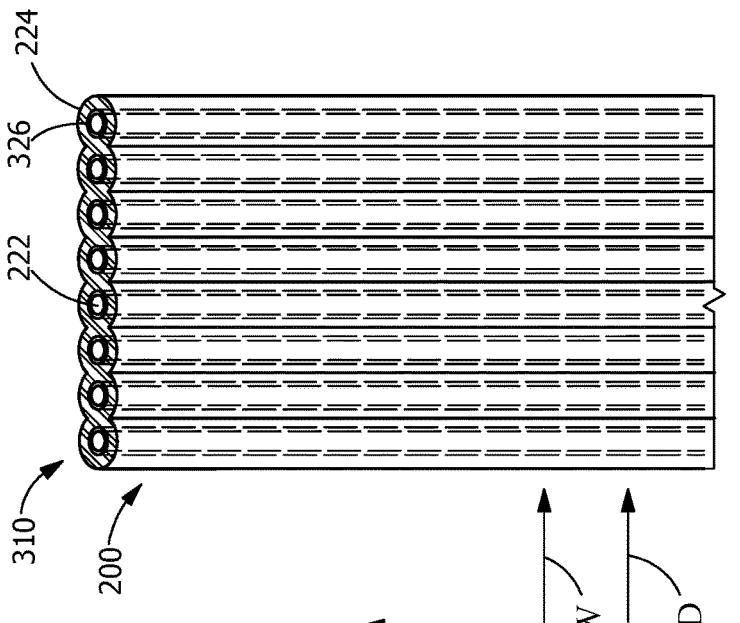
FIG. 7 is an enlarged schematic view of an augmented ribbon, according to an alternate embodiment of the present disclosure.

In another embodiment of the present disclosure, as shown in FIG. 7, augmentation portion 326 is arranged circumferentially about the electrical lead portion 222 within the sheath portion 224. In this embodiment, as in the embodiment shown in FIGS. 5 and 6, the augmentation portion 326 imparts a resistance to flexing or bending of ribbon 200 about the axis AX-BEND parallel to its width dimension EL-W and may impart to ribbon 200 a greater resistance to flexing or bending of ribbon 200 about the axis AX-BEND than any of the other portions of ribbon 200 or may operate in combination with the other portions of ribbon 200 to impart the ribbon 200 with a desired resistance to flexing or bending of ribbon 200 about the axis AX-BEND. In one embodiment, the augmentation portion 326 is moveable with respect to sheath portion 224 and, like the sheath portion 224 and the electrical lead portion 222, the augmentation portion 326 may have load memory when wound on the spool-up sheave 540.

Figure 8:
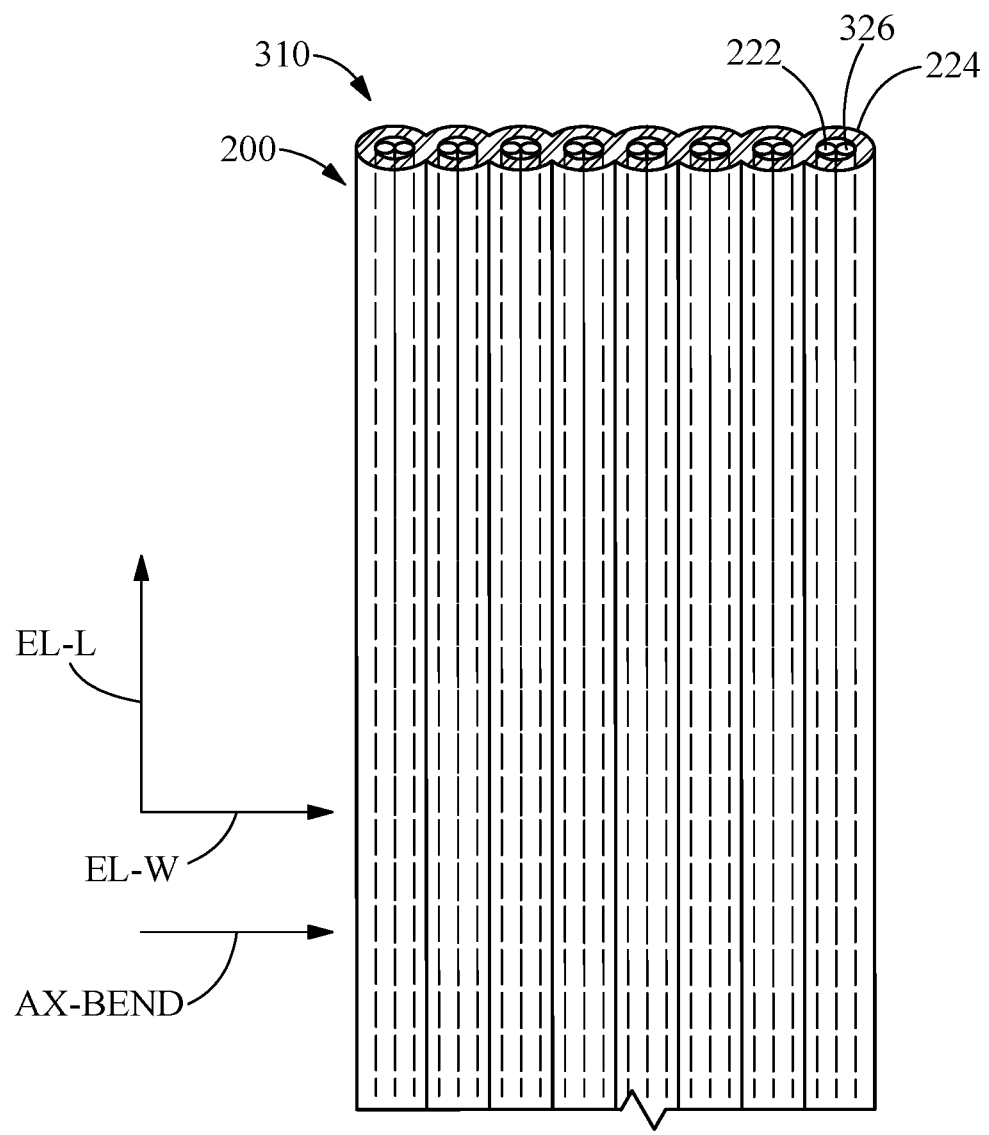
FIG. 8 is an enlarged schematic view of an augmented ribbon, according to an alternate embodiment of the present disclosure.

In another embodiment of the present disclosure, as shown in FIG. 8, augmentation portion 326 is arranged parallel to the electrical lead portion 222 within sheath portion 224. In this embodiment, as in the embodiment shown in FIGS. 5-7, the augmentation portion 326 imparts a resistance to flexing or bending of ribbon 200 about the axis AX-BEND parallel to its width dimension EL-W and may impart to ribbon 200 a greater resistance to flexing or bending of ribbon 200 about the axis AX-BEND than any of the other portions of ribbon 200 or may operate in combination with the other portions of ribbon 200 to impart the ribbon 200 with a desired resistance to flexing or bending of ribbon 200 about the axis AX-BEND. In one embodiment, the augmentation portion 326 parallel to the electrical lead portion is moveable with respect to sheath portion 224. Likewise, the augmentation portion may be moveable with respect to the electrical lead portion 222 and may independently bear loads or shear loads with the electrical lead portion 222. Like the sheath portion 224 and the electrical lead portion 222, the augmentation portion 326 may have load memory when wound on the spool-up sheave 540.

The sheath portion 224 of ribbon 200 may be comprised entirely of synthetic material, entirely of non-synthetic material, or a combination of synthetic material and non-synthetic material. For example, in one embodiment, ribbon 200 may be comprised of one hundred percent polyester (i.e., synthetic) material. Other suitable materials include, but are not limited to, nylon, aramid fibers or TREVIRA® fibers (available from Trevira GmbH, Frankfurt, Germany). Other properties of ribbon 200, such as, for example, elongation properties, tensile strength, resistance to breakage, weight, size, load bearing capacities and other suitable fiber properties, can be selected as appropriate for the operational conditions in which the ribbon 200 will be deployed. The periphery of the volume delimited by the fibers 260 of the sheath portion 224 (see, for example, FIGS. 9-12) is bounded by the body region of the body portion of the ribbon 200 and this body region includes a material composition that serves to retain the fibers of the sheath portion 224 and the electrical leads in the prescribed relationship to one another. In addition, the sheath portion 224 is preferably a fire-retardant material. As noted above, in one embodiment, the sheath portion 224 permits relative movement or motion of the sheath portion 224, electrical lead portion 222, and, when present, the augmentation portion 326 with respect to one another.

Figure 9:
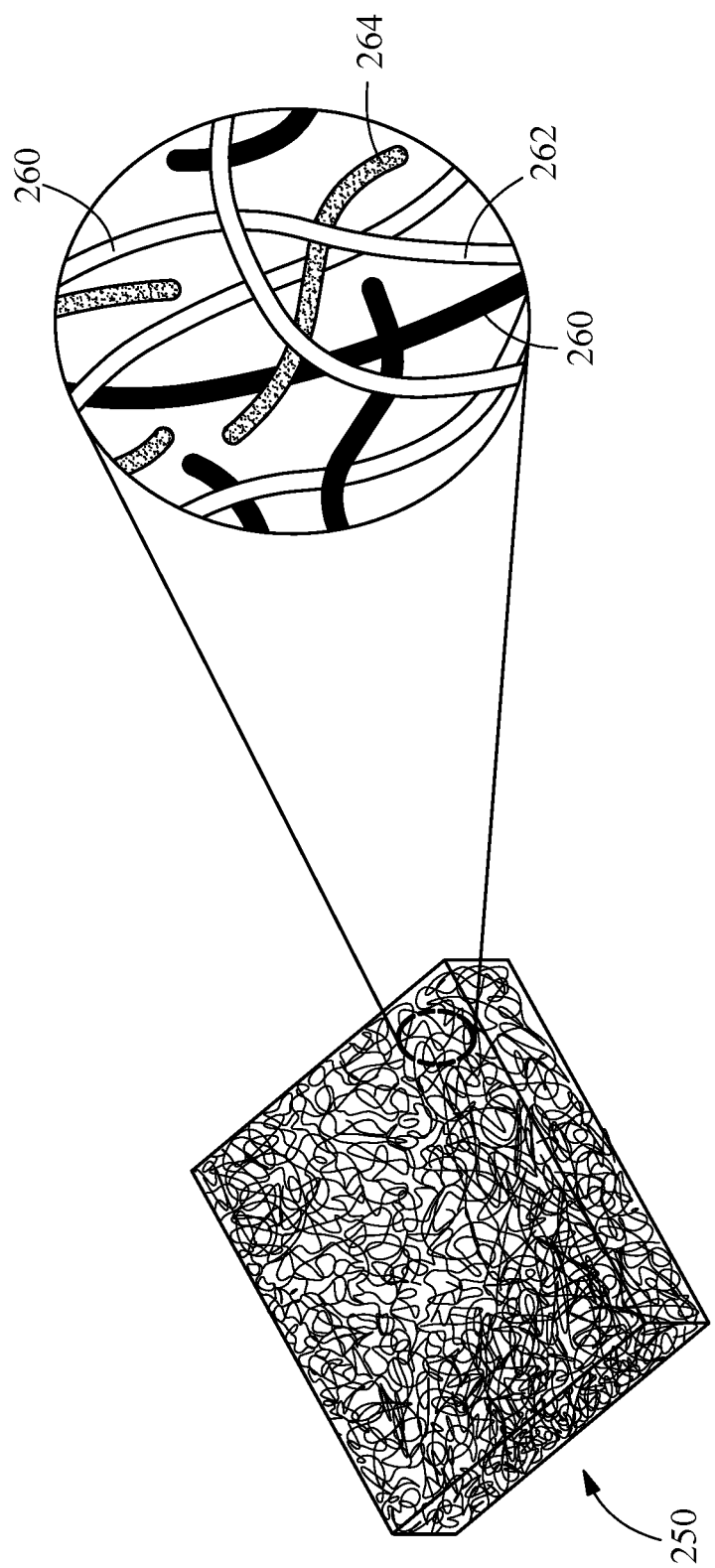
FIG. 9 is an enlarged schematic view of a portion of the non-oriented fiber region of the sheath portion of a ribbon and showing a collection of non-oriented fibers, according to an embodiment of the present disclosure.

In one embodiment according to the present disclosure, the fibers 260 in sheath portion 224 are in a non-oriented configuration. FIG. 9 shows an enlarged schematic view of an arrangement of fibers 260 that make up the sheath portion 224 or ribbon 200. In this embodiment, the sheath portion includes a collection 250 of non-oriented fibers 260—i.e., the fibers have not been purposefully handled or treated to promote longitudinal alignment of the fibers. Also shown in FIG. 9 is an enlarged schematic view of an area of the collection 250 of non-oriented fibers 260 showing a plurality of synthetic fibers 262 and a plurality of non-synthetic fibers 264 interspersed with one another into a mat arrangement providing sufficient structure to laterally support the electrical lead portion 222.

Figure 10:
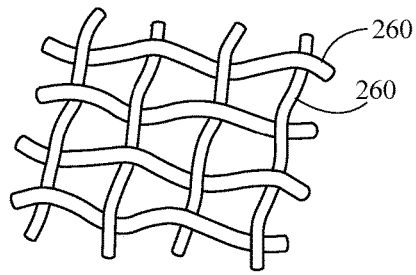
FIG. 10 is an enlarged schematic view of a portion of a woven fiber region of the sheath portion of a ribbon, according to an embodiment of the present disclosure.

In another embodiment according to the present disclosure, the fibers 260 in sheath portion 224 are in a woven configuration. As shown in FIG. 10, fibers 260 are arranged in an overlapping, woven pattern that provides sufficient structure to laterally support the electrical lead portion 222. While a specific woven pattern is shown in FIG. 10, the sheath portion 224 is not so limited and any suitable overlapping woven pattern may be utilized. The woven configuration is arranged primarily for lateral support and, in one embodiment, provides little or no longitudinal support of the load.

Figure 11:
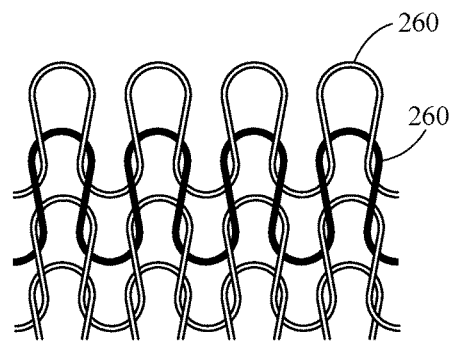
FIG. 11 is an enlarged schematic view of a portion of a knitted fiber region of the sheath portion of a ribbon, according to an embodiment of the present disclosure.

In another embodiment according to the present disclosure, the fibers 260 in sheath portion 224 are in a knitted configuration. As shown in FIG. 11, fibers 260 are arranged in an looped, knitted pattern that provides sufficient structure to laterally support the electrical lead portion 222. While a specific knitted pattern is shown in FIG. 11, the sheath portion 224 is not so limited and any suitable looped, knitted pattern may be utilized. The knitted configuration is arranged primarily for lateral support and, in one embodiment, and provides little or no longitudinal support of the load.

Figure 12:
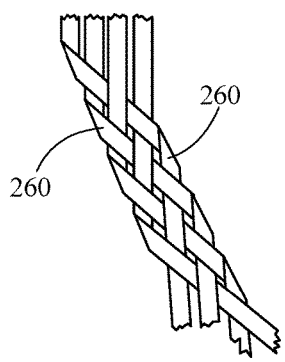
FIG. 12 is an enlarged schematic view of a portion of a braided fiber region of the sheath portion of a ribbon, according to an embodiment of the present disclosure.

In another embodiment according to the present disclosure, the fibers 260 in sheath portion 224 are in a braided configuration. As shown in FIG. 12, fibers 260 are arranged in a braided pattern that provides sufficient structure to laterally support the electrical lead portion 222. While a specific braided pattern is shown in FIG. 12, the sheath portion 224 is not so limited and any suitable braided pattern may be utilized. The braided configuration is arranged primarily for lateral support and, in one embodiment, provides little or no longitudinal support of the load.

Electrical lead portion 222 of ribbon 200 may be comprised of any suitable electrically conductive materials, such as copper, aluminum, or other conductive materials. In other embodiments, electrical lead portion 222 may include non-electrically conductive material, such as fiber optic materials or other signal transmitting materials suitable for providing signals to the load.

In operation, ribbon 200 is subjected to varying flexural stress and varying tensile stress. The direction and magnitude of each of these stresses is a function of rate and frequency of acceleration or deceleration of the ribbon 200 as it is respectively paid out (unwound) from the drum or sheave on which it is wound or as it is wound onto the drum or sheave, the mass and geometry of the load secured to the free end of the ribbon 200, any lateral forces applied to the load as it is moved via the ribbon 200, and other factors, such as material composition of the ribbon 200.

Twisting, folding, or other torsional effects on ribbon 200 may occur as the ribbon 200 is unwound or wound relative to the drum or sheave. In a common winding-up scenario in which the ribbon 200 is wound onto the drum or sheave, each successive increment of the ribbon 200 is wound onto increments of the ribbon 200 that have already been built up upon still other increments of the ribbon 200 previously wound onto the drum or sheave and it is often preferred that these built-up windings of the ribbon 200 exhibit the minimum possible degree of twisting, which in this circumstance is to be understood as a condition of the ribbon 200 wherein an edge portion of the ribbon 200 extends outwardly of the plane delimited by the length dimension EL-L and the width dimension EL-W beyond a predetermined magnitude. While the applicant does not wish to be bound to a particular theory, it is believed that, in some circumstances, the degree of twisting can be minimized or, conversely, a degree of twisting of the ribbon 200 can be permitted, via configuring ribbon 200 with a relatively flat profile and with a material composition that permits limited elongation of the sheath portion, limited internal displacement of fibers of the sheath portion, and limited freedom of individual electrical leads relative to adjacent electrical leads. In one embodiment, the relative movement or motion between the sheath portion 224, the electrical lead portion 222 and, if present, the augmentation portion 326, permits load memory over repeated winding and unwinding cycles. That is, upon winding and unwinding of ribbon 200, the individual vertical loads across the length of ribbon 200 on the electrical lead portion 222 and/or the augmentation portion 326 are saved when ribbon 200 is wound on the drum or sheave. For example, each of the electrical lead portions 222 across the width EL-W will have an individual load resulting from the load configuration and positioning. The individual load will be saved upon winding and, when unwound, ribbon 200 releases the stored loads and balances the load distribution, permitting the system to lower (or raise) the load with little or no twisting, folding, or other torsional effects on ribbon 200. In one embodiment, the load memory results in a substantially twist-free unwinding upon a plurality of winding and unwinding cycles of ribbon 200 upon a sheave structure. The load memory effect increases with the number of windings and unwindings of ribbon 200. For example, in one embodiment at least about 25 winding/unwinding cycles or at least about 50 winding/unwinding cycles or at least about 75 winding/unwinding cycles results in the load memory effect.

Ribbon 200 may be incorporated into a system that comprises a winch apparatus for manipulating loads associated with public performances, such as performances involving performers and staging equipment. Also, ribbon 200 may be incorporated into a display system that comprises a winch assembly manipulating loads 205, such as, for example, illuminated or illuminating items, sound or sensory media items, or visual displays. In each such installation, winch assembly 520 having ribbon 200 of the present invention may be comprised of a base and a housing operatively connected to the base. The housing includes a rotatably movable drum configured to extend/retract the ribbon 200, a motor for rotatably moving the drum, and a controller for controlling the motor.

Figure 15:
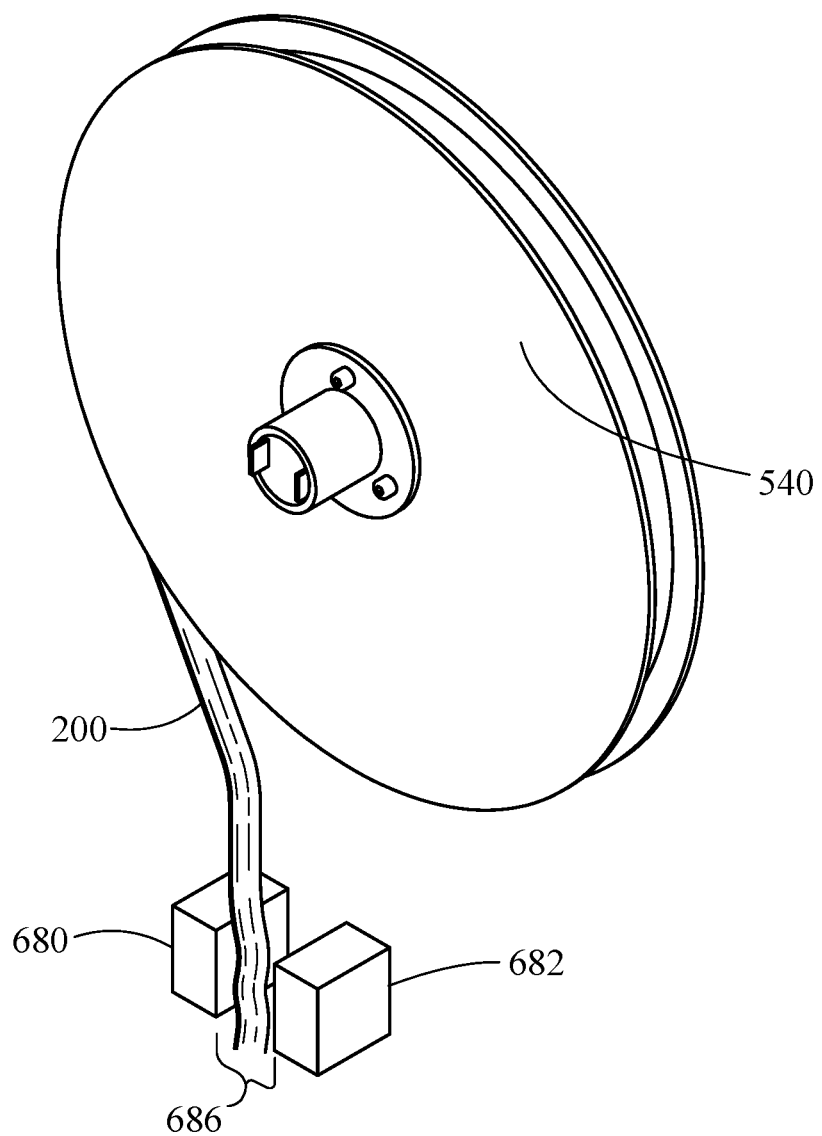
FIG. 15 is a front perspective view of an exemplary winch assembly for deploying the ribbon of the present invention.

In one embodiment according to the present disclosure, ribbon 200 may advantageously be deployed in a known trolley system 100 described in U.S. Pat. No. 9,026,269 to Cross et al., which is incorporated by reference in its entirety. FIG. 15 shows a front plan schematic view of the trolley system 100 of U.S. Pat. No. 9,026,269 to Cross et al.

U.S. Pat. No. 9,026,269 to Cross et al. notes that the therein described trolley system 100 can include at least one support member 102, at least one trolley or carriage 104, at least one load 106, at least one travel positioning mechanism 112, at least one lift positioning mechanism 123, at least one lift line 110 and at least one automation and motion control system 116 to control the operation of the system 100, including the travel positioning mechanism 112 and the lift positioning mechanism 123. The system 100 can position and reposition a load 106 in a two-dimensional (2D) or three-dimensional (3D) space according to a control algorithm executed by the control system 116 by moving the trolley 104 along the support member 102 and by moving the lift line 110 by the lift positioning mechanism 123.

According to U.S. Pat. No. 9,026,269 to Cross et al., the support member 102 can be a beam or other suitable member, such as a track, rail, truss or pipe, that can provide structural support for the trolley or carriage 104 (or a suspended shuttle or cart or tram or any other apparatus that can move along the support member 102 and support the load 106). In an exemplary embodiment, according to U.S. Pat. No. 9,026,269 to Cross et al., the support member 102 can be mounted above the performance area of a live performance or event, e.g., a sporting event, a concert or a theatrical/religious performance, or a movie or television production. The system 100 can include multiple support members 102 mounted at various angles (e.g., between about 0 degrees and about 45 degrees) relative to the performance area or mounted at various angles (e.g., between about 0 degrees and about 45 degrees) relative to each other. The multiple support members 102 can have any suitable arrangement or configuration including stacked, parallel, or intersecting.

The trolley system 100 described in U.S. Pat. No. 9,026,269 to Cross et al. is disclosed as being operable to position and reposition a load 106 relative to the performance area and it is noted that suitable loads include, but are not limited to, performers, equipment, instruments, props, lights, lighting systems, cameras, scenery, sets, microphones, or speakers.

In one embodiment, the trolley or carriage 104 can have one or more travel positioning mechanisms or drive mechanisms 112 mounted on or incorporated in the trolley or carriage 104 to move the trolley or carriage 104. The travel positioning mechanism or drive mechanism 112 can be powered either directly from a wireless power source, e.g., an inductive power transfer system, or from batteries or other energy-storing devices charged by the wireless power source. When actuated or engaged, the travel positioning mechanism(s) 112 can adjust the position, speed, and acceleration or deceleration of the trolley or carriage 104 along the support member 102.

According to U.S. Pat. No. 9,026,269 to Cross et al., the lift line 110 can be an elongate member, such as cable, rope, cord, band, chain-links or hydraulic or pneumatic cylinder. The lift line 110 can be used to provide motion and positioning to the load 106. The lift line 110 is connected to the load 106 and to the lift positioning mechanism 123 mounted to the trolley or carriage 104. The lift positioning mechanism 123 controls the lift line 110 to adjust the position, speed, and acceleration or deceleration of the load 106 relative to the carriage 104.

The lift positioning mechanism 123 controls the lift line 110 substantially simultaneously with the travel positioning mechanism 112 controlling the movement of trolley or carriage 104, to permit load 106 to be positioned and repositioned as carriage 104 is positioned and repositioned along support member 102. In one embodiment, the lift positioning mechanism 123 can be an automated device, such as a variable control or computer controlled winch, chain hoist, lift or elevator.

According to U.S. Pat. No. 9,026,269 to Cross et al., in one embodiment, the trolley or carriage 104 can include a cart 118 and a load mount 122. The cart 118 may include a plurality of wheels or rollers 126, at least one of which is driven by the travel positioning mechanism 112. A cart frame 124 can include a load mounting member connection 132 positioned proximal to the load 106. The plurality of wheels or rollers 126 can engage, roll, and/or slide along an engagement surface 134 of the support member 102, enabling the cart 118 and carriage 104 to move along the support member 102.

Figure 13:
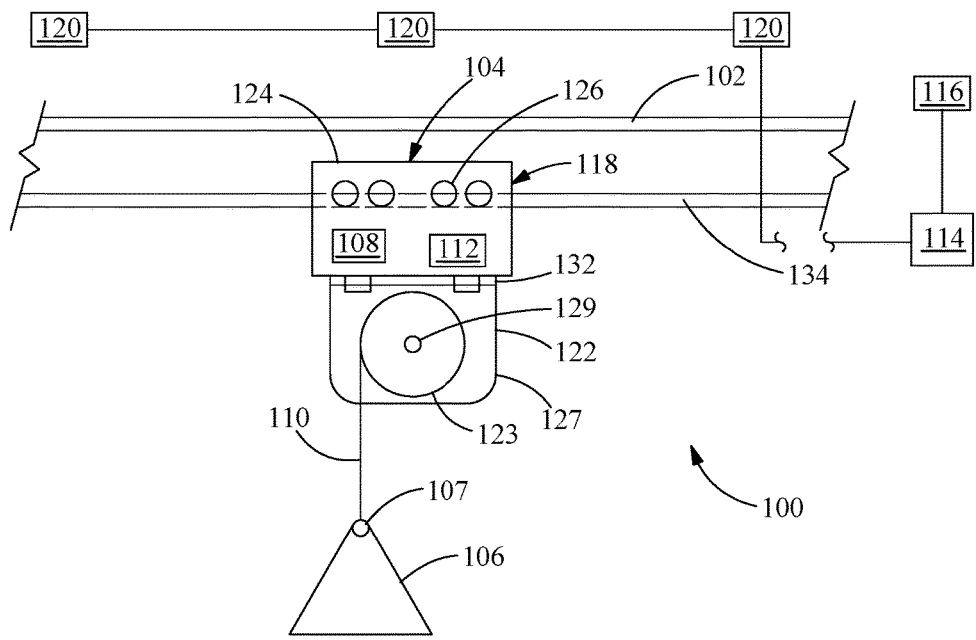
FIG. 13 is a front plan schematic view of a prior art trolley system.

A deployment of ribbon 200, according to an embodiment of the present disclosure, in the trolley system 100 described in U.S. Pat. No. 9,026,269 to Cross et al., as has been described with respect to FIG. 13 of the present application, would involve the deployment of the ribbon 200 as the lift line 110, whereupon the ribbon 200 would have one end fixedly mounted to the lift positioning mechanism 123, which could be, for example, a fixed mounting of the one end of the ribbon 200 to a rotating drum of the lift positioning mechanism 123 having an outer annular surface onto which the ribbon is wound. An opposite end of the ribbon 200 would be mounted to the load 106. In the event that the load 106 comprises a component that draws an electrical current, such as, for example, an illuminated item in the form of light emitting diodes (LED), then the electrical leads embedded in the ribbon 200 would be operatively connected to this component. A supply of electrical current can then flow through the electrical leads of the ribbon 200 to the load 106 and, in this connection, a suitable electrical source (not shown) can be operatively connected to the lift positioning mechanism 123 for supplying electrical current to the ribbon 200.

Figure 14:
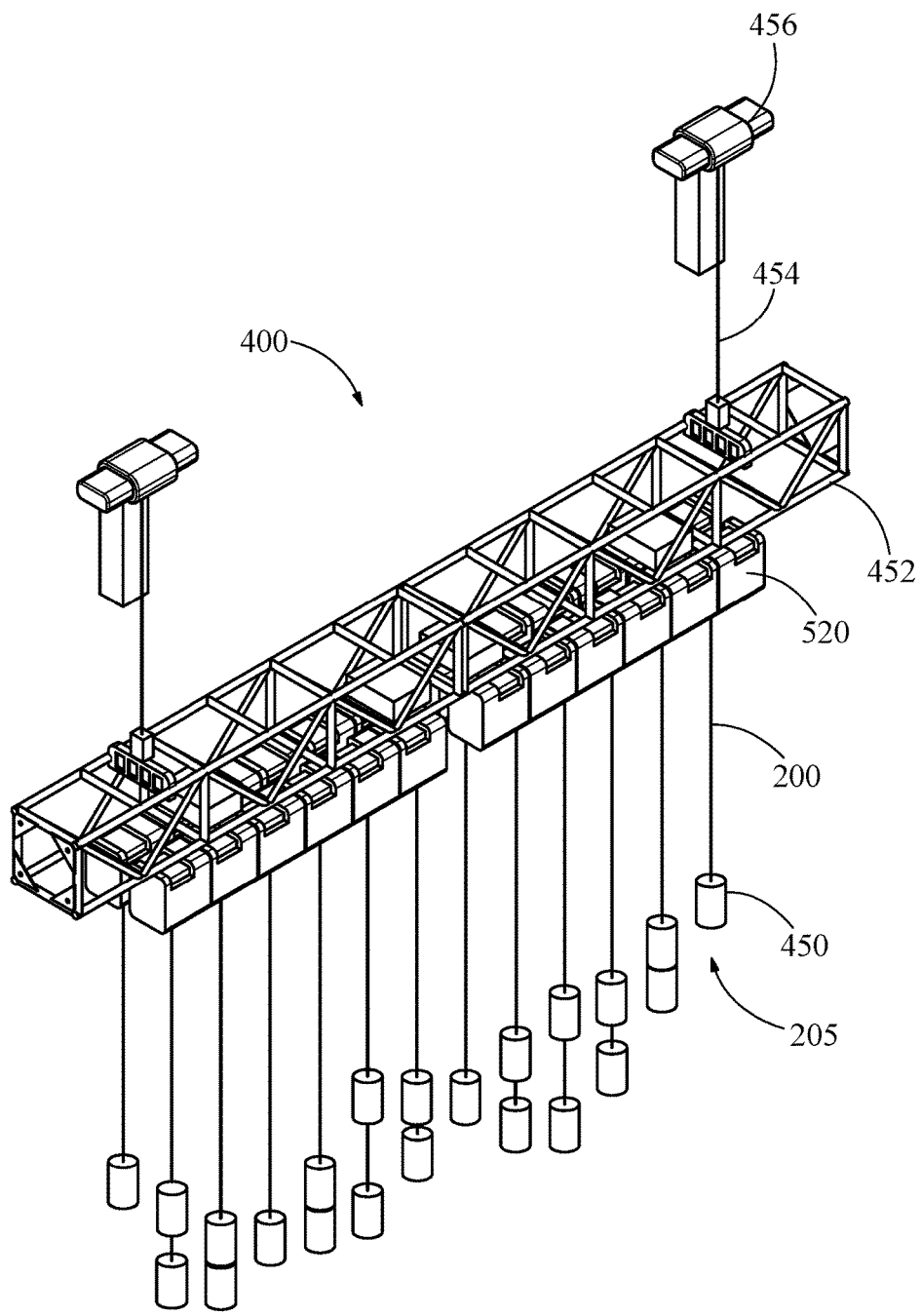
FIG. 14 is a front perspective view of an exemplary winch apparatus for manipulating loads associated with public performances.

In another embodiment according to the present disclosure, winch assembly 520 is incorporated into a movable visual display system. FIG. 14 shows a front perspective view of a moveable visual display system 400 that comprises a winch apparatus for manipulating loads associated with public performances, such as performances involving performers and staging equipment. A plurality of winch assemblies 520 are configured to each independently raise and lower a respective one of a plurality of individual loads 205, each of which is exemplarily shown as being an illuminated item 450 in the form of light emitting diodes (LED) retained in a transparent container. Each winch assembly 520 may be configured as a base and a housing operatively connected to the base with the housing including a rotatably movable drum configured to extend/retract a single unit of the ribbon 200, a motor for rotatably moving the drum, and a controller for controlling the motor. Each winch assembly 520 is controlled via a suitable control arrangement (not shown) to selectively raise or lower the respective illuminated item 450 while electrical power is continuously or intermittently supplied to the LEDs of the illuminated item 450.

As shown in FIG. 14, winch assemblies 520 are suitably fixedly mounted to an underside of a truss 452 and the truss 452, in turn, is suspended from a fixed structure, such as, for example, an interior support structure of a building (not shown) via a pair of truss positioning assemblies 456 that are directly mounted to the interior support structure of the building. Each truss positioning assembly 456 is operable to extend/retract a truss support cable 454 each having one end mounted to a top side of the truss 452.

Reference is now had to FIG. 15, which is a front perspective view of a further exemplary winch arrangement for deploying the ribbon 200 of the present invention. A spool-up sheave 540 is operable to wind up the ribbon 200. Ribbon 200 travels between a pair of guide structures 680, 682 which form a guide gap 686 therebetween that is, for example, an order of magnitude greater than the thickness of ribbon 200. In this embodiment, ribbon 200 is not trained along either of the guide structures 680, 682 but may contact one or both of these guide structures 680, 682 as the ribbon 200 is wound onto the spool-up sheave 540. The guide gap 686 between the guide structures 680, 682 is sized to permit the ribbon 200 to undergo a predetermined degree of flexure or twisting during its passage therethrough. In another embodiment, guide structure 680, 682 are arranged to provide a guide gap that guides the ribbon 200 onto the peripheral surface of the spool-up sheave and/or onto an already taken-up extent of the ribbon 200. Guide gap 686 is any suitable dimension that permits passage of ribbon 200 in a guided manner wherein ribbon 200 is not subjected to pinching or compressive forces. While guide structure 680, 682 are shown as a pair of structures, any suitable number and any suitable configuration of guide structures may be utilized.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A take-up assembly for selectively taking up and permitting the playing out, of a ribbon, the take-up assembly including:
   a ribbon comprising:
      an electrical lead portion having one or a plurality of individual electrical leads; and
      a sheath portion surrounding the electrical lead portion; wherein the sheath portion and the electrical lead portion are moveable with respect to each other;
   a collection element having a peripheral surface and delimiting a collection element axis about which the peripheral surface can be moved during a take-up operation in which the ribbon is taken up onto the peripheral surface;
   the ribbon being connected to a load to support the load during lifting and lowering of the load while the load is suspended during operation of the take-up assembly, the ribbon operable to guide an electric current supply or control signals to the load;
   wherein the suspended load maintains tension on the ribbon.

2. The take-up assembly according to claim 1, wherein the collection element is a take-up sheave.

3. The take-up assembly according to claim 1, wherein electrical power can be supplied to the load at least while movement of the load occurs.

4. The take-up assembly according to claim 1, wherein at least one guide structure arranged and disposed form a guide gap having a dimension sufficient to permit untwisting movement of the flexible member.

5. The take-up assembly according to claim 1, wherein at least one guide structure arranged and disposed form a guide gap that guides the ribbon onto the peripheral surface and/or onto an already taken-up extent of the ribbon.

6. The take-up assembly according to claim 1, wherein at least one guide structure arranged and disposed form a guide gap having a dimension sufficient to permit untwisting movement of the flexible member and guides the ribbon onto the peripheral surface and/or onto an already taken-up extent of the ribbon.

7. The take-up assembly according to claim 1, wherein the assembly is free of pinch rollers in the area of feed onto the peripheral surface of the collection element.

8. A method of selectively taking up, and permitting the playing out, of a ribbon onto the take-up assembly of claim 1, the method including:

providing a ribbon comprising:
   an electrical lead portion having one or a plurality of individual electrical leads; and
   a sheath portion surrounding the electrical lead portion;
   wherein the sheath portion and the electrical lead portion are moveable with respect to each other;
taking up the ribbon in a manner whereby twisting of the ribbon may occur;
permitting the flexible member to untwist at least partially from its twisted state in the event that the flexible member obtains a twisted state during the step of taking up.

9. The method according to claim 8, wherein the step of permitting the ribbon to untwist at least partially includes permitting a run of the ribbon that has been wound on the take-up assembly to untwist at least partially as subsequent runs of the ribbon are wound onto the take-up assembly.

10. The take-up assembly according to claim 1, wherein the take-up assembly comprises a winch for manipulating the load.

* * * * *